(12) United States Patent
Cranford

(10) Patent No.: US 7,026,619 B2
(45) Date of Patent: Apr. 11, 2006

(54) DETECTOR WITH COATED LENS ASSEMBLY

(75) Inventor: Ronald D. Cranford, Harrisburg, NC (US)

(73) Assignee: Suppression Technologies, Inc., Atlanta, GA (US)

( * ) Notice: Subject to any disclaimer, the term of this patent is extended or adjusted under 35 U.S.C. 154(b) by 0 days.

(21) Appl. No.: 10/954,324

(22) Filed: Sep. 30, 2004

(65) Prior Publication Data

US 2005/0184240 A1    Aug. 25, 2005

Related U.S. Application Data

(60) Provisional application No. 60/546,449, filed on Feb. 20, 2004.

(51) Int. Cl.
*G01J 5/08* (2006.01)

(52) U.S. Cl. .................................................. 250/353
(58) Field of Classification Search ................. 250/353
See application file for complete search history.

(56) References Cited

U.S. PATENT DOCUMENTS

| | | | |
|---|---|---|---|
| 4,065,600 A | 12/1977 | King et al. | |
| 4,394,572 A | 7/1983 | Wilber | |
| 4,415,806 A | 11/1983 | Tar | |
| 4,855,718 A * | 8/1989 | Cholin et al. | 340/578 |
| 4,985,719 A * | 1/1991 | Tsurukawa et al. | 396/529 |
| 5,061,026 A * | 10/1991 | Clarke et al. | 385/31 |
| 5,358,787 A | 10/1994 | Fontana et al. | |
| 5,486,847 A | 1/1996 | Ranf et al. | |
| 5,629,074 A * | 5/1997 | Klocek et al. | 428/212 |
| 5,752,914 A | 5/1998 | Delonzor et al. | |
| 6,184,521 B1 | 2/2001 | Coffin, IV et al. | |
| 6,288,637 B1 | 9/2001 | Thomas et al. | |
| 6,448,158 B1 | 9/2002 | Peng et al. | |

OTHER PUBLICATIONS

"ITO, Tin-Doped Indium Oxide For Optical Coating", Cerac Incorporated [online], 2000 [retrieved on Feb. 18, 2005], Retrieved from internet: http://www.cerac.com/pubs/proddata/ito.htm.

"Emi/rfi shielding—Laminated Windows", Optical Filters [online], 2002 [retrieved on Feb. 19, 2005], Retreived from internet: http://www.opticalfilters.co.uk/products/laminations/emirfishieldinglaminatedwindows.htm.

David Carter, "RFI Shielded Windows", Tecknit Europe Ltd. May 2003 [retrieved on Feb. 18, 2005] retrieved from internet: www.twp-europe.co.uk/catalog/windowsguide.pdf.

\* cited by examiner

*Primary Examiner*—Constantine Hannaher
(74) *Attorney, Agent, or Firm*—Adams Evans P.A.

(57) ABSTRACT

A spark detector lens assembly is adapted to block energy from static electric discharges. The lens assembly includes a housing which receives a lens. The lens is adapted to pass infrared frequency energy therethrough. A conductive coating is disposed on one side of said lens, which is effective to block radio frequency energy but pass infrared frequency energy. The conductive coating may be electrically connected to an electrical ground path. The lens assembly is especially effective for preventing false alarms by shielding a spark detector from radio frequency energy radiated by static electric discharges.

10 Claims, 3 Drawing Sheets

DETECTOR WITH COATED LENS ASSEMBLY

CROSS-REFERENCE TO RELATED APPLICATIONS

This application claims the benefit of U.S. Provisional Application No. 60/546,449, filed Feb. 20, 2004.

BACKGROUND OF THE INVENTION

This invention relates generally to fire detection systems and more particularly to a fire detection system using an optical spark detector. Fire detection systems are often used in textile mills or other industrial environments where flammable materials such as textile fibers are entrained in a moving air stream and thus conveyed at high speed through enclosed duct work between processing stations which perform various kinds of operations on the fibers. Infrared detectors are positioned in the duct work at intervals and are designed to detect the presence of embers or hot metal fragments in the moving air stream which could cause a fire or explosion. An infrared detector detecting a source of infrared energy in the moving air stream generates a signal which may used to activate a visual or audible alarm. The signal may also be sent to a control panel, where further signals are transmitted to instantly shut off the fiber processing equipment. Signals may also operate diverters, fire extinguishers or other equipment intended to protect life and property from a fire or explosion.

This type of system senses primarily the infrared (IR) energy generated by a glowing ember. However, the material flowing through the ducts protected by such systems generates significant static electricity which spontaneously discharges from time to time. Unfortunately, when these static electric discharges occur they radiate energy, primarily radio frequency (RF) energy, which can trigger the detector and cause an alarm. Existing spark detection systems can not distinguish between these false alarms and a true spark.

Therefore, it is an object of the invention to provide a spark detection system which is resistant to false alarms caused by static electric discharges.

It is another object of the invention to provide a detector lens which blocks radio frequency but passes infrared energy.

BRIEF SUMMARY OF THE INVENTION

These and other objects are met in one preferred embodiment by providing a spark detector lens assembly adapted to block energy from static electric discharges. The lens assembly includes a housing for receiving a lens; a lens disposed in the housing, which is adapted to pass infrared frequency energy therethrough; and a conductive coating disposed on one side of the lens, which is effective to block radio frequency energy but pass infrared frequency energy therethrough. Means are provided for electrically connecting the conductive coating to an electrical ground path.

According to another preferred embodiment of the invention, the housing is electrically conductive.

According to another preferred embodiment of the invention, the conductive coating is electrically connected to the housing.

According to another preferred embodiment of the invention, a conductive epoxy is disposed in contact with the conductive coating and the housing.

According to another preferred embodiment of the invention, the conductive coating is composed of indium-tin-oxide.

According to another preferred embodiment of the invention, the thickness of the coating is from about 1 micron to about 4 microns.

According to another preferred embodiment of the invention, the thickness of the coating is about 1 micron.

According to another preferred embodiment of the invention, a spark detector includes a spark sensor responsive to the impingement of radiation thereon; a lens adapted and positioned to pass infrared energy therethrough to the spark sensor; a conductive coating disposed on one side of the lens, the coating effective to block radio frequency energy but pass infrared energy therethrough; and an electrical ground path connected to the coating.

According to another preferred embodiment of the invention, the housing is mounted in a casing.

According to another preferred embodiment of the invention, the casing is electrically conductive and is connected to an electrical ground path.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
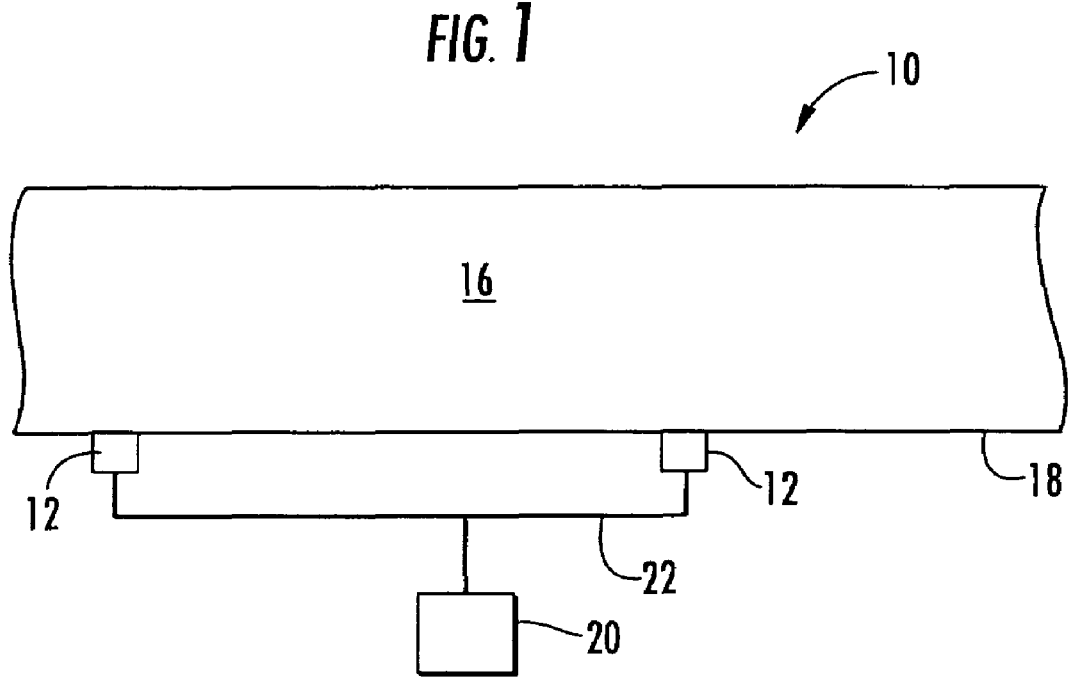
FIG. 1 is schematic view of a fire detection system constructed in accordance with the present invention.

Referring to the drawings wherein identical reference numerals denote the same elements throughout the various views, FIG. 1 illustrates an exemplary fire detection system 10 constructed in accordance with the present invention. The system 10 includes one or more detector assemblies 12. Each detector assembly 12 is mounted to a protected space 16 so that its field of view will cover the desired area. In the illustrated example the protected space 16 is defined by a suction system duct 18 of a textile machine. However, the present invention may be used to detect sparks in any kind of equipment.

The detector assemblies 12 may be connected to a central control unit 20 by wires 22. The central control unit 20 may be a PC computer, programmable logic controller (PLC), or other known device. The central control unit 20 can perform known functions such as monitoring and self-testing the spark detector assemblies 12, triggering audible and visual alarms, shutting down the protected equipment, alarm logging, etc.

Figure 2:
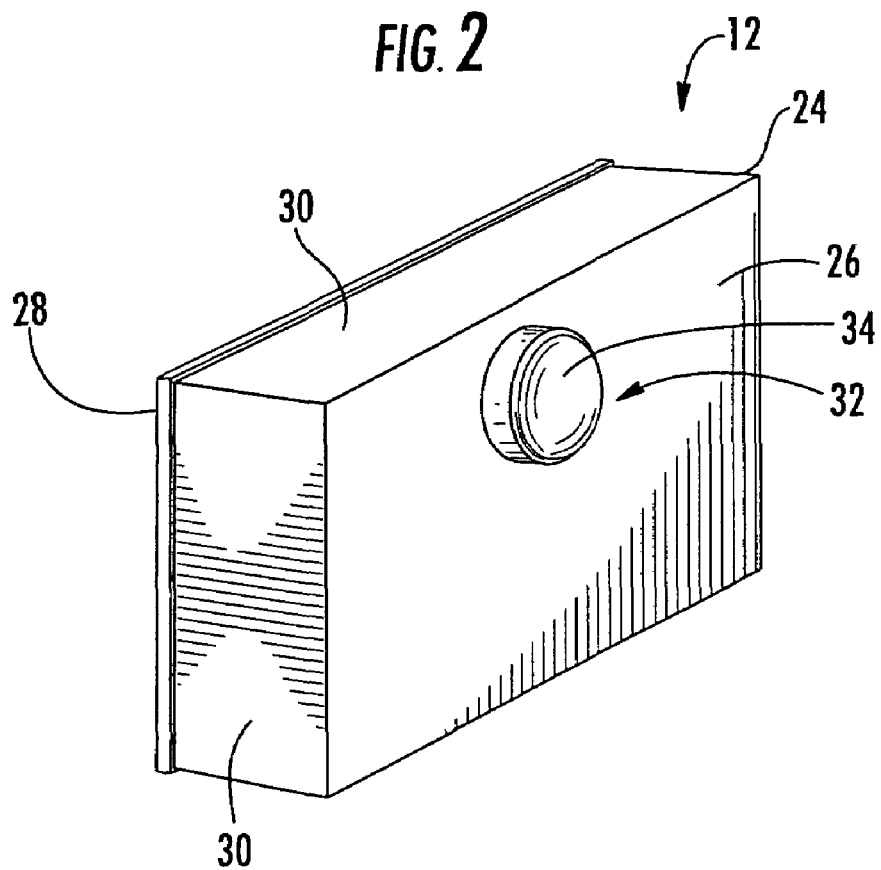
FIG. 2 is a perspective view of a detector assembly.
Figure 3:
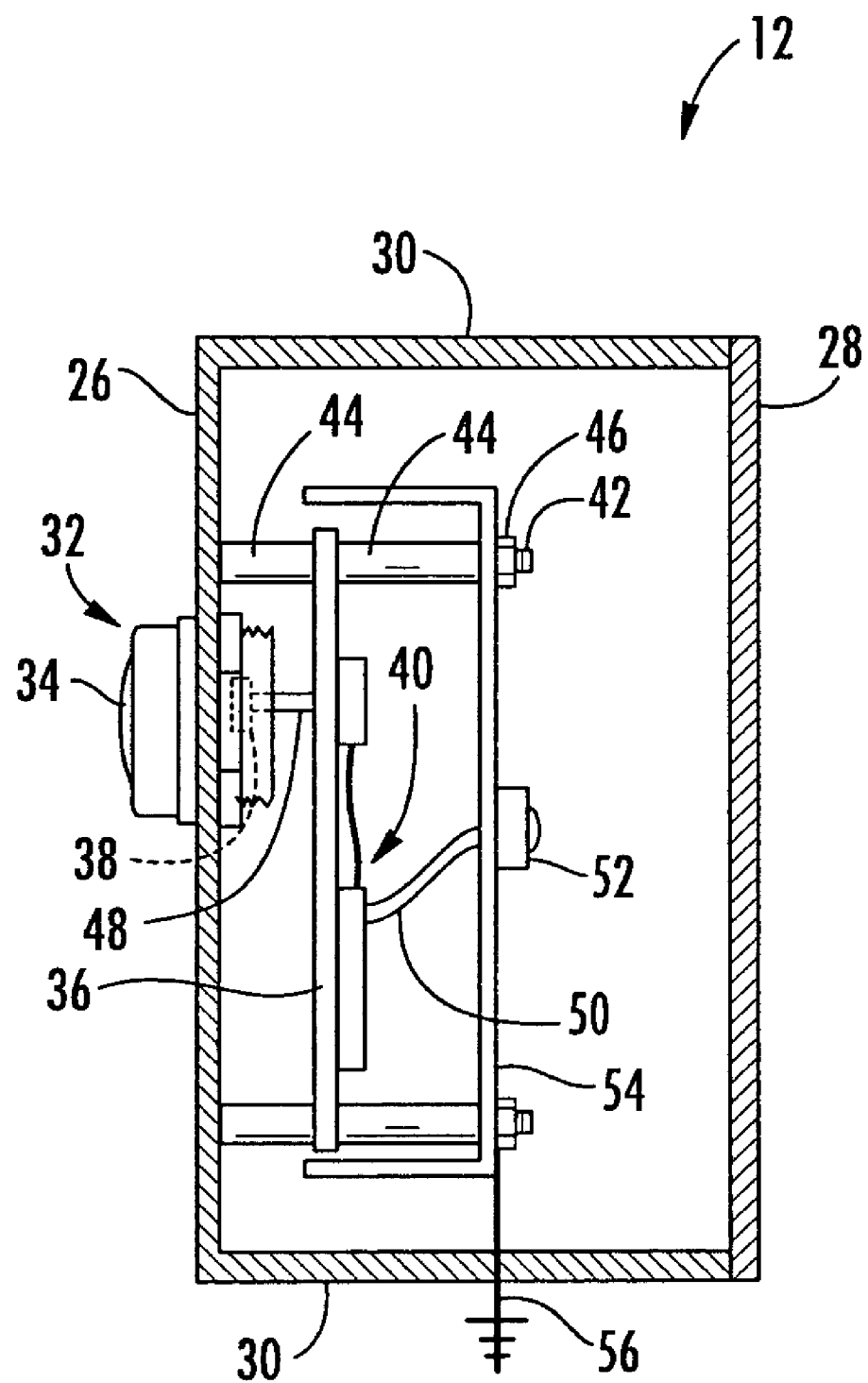
FIG. 3 is a side cross-sectional view of the detector assembly of FIG. 2.

FIGS. 2 and 3 illustrate an exemplary detector assembly 12. The detector assembly 12 includes a sheetmetal housing 24 having a front plate 26, a removable back plate 28, and a plurality of side walls 30. A lens assembly 32 containing a lens 34 is installed into an opening in the front plate 26. The lens 34 may be curved as depicted or may be flat. A printed circuit board (PCB) 36 containing a spark sensor 38 and sensor amplification and control circuits 40 of a known type is mounted in the housing 24, for example with the illustrated studs 42, standoffs 44, and nuts 46. The spark sensor 38 is mounted so that it faces through the lens 34. In the illustrated example, the spark sensor 38 is located in the correct position by selection of the length of the sensor leads 48 that connect it to the PCB 36. A plurality of input and output leads 50 run from the PCB 36 to a terminal block 52 which is mounted on a cover 54 that protects the PCB 36. The housing 24, lens assembly 32, and internal components are connected to a ground path 56. The particular structure of the detector assembly 12 is for illustration only and may be modified to suit a particular application. For example, the housing 24 could be constructed of a conductive plastic, high-temperature plastic, or composite material. Nonlimiting examples of suitable high-temperature plastics include polyphenylene oxide (PPO) resin or a combination of PPO and styrene which is available under the trade name NORYL. The housing may be electroplated to make it electrically conductive. The lens assembly 32 could be made an integral part of the housing 24.

Figure 4:
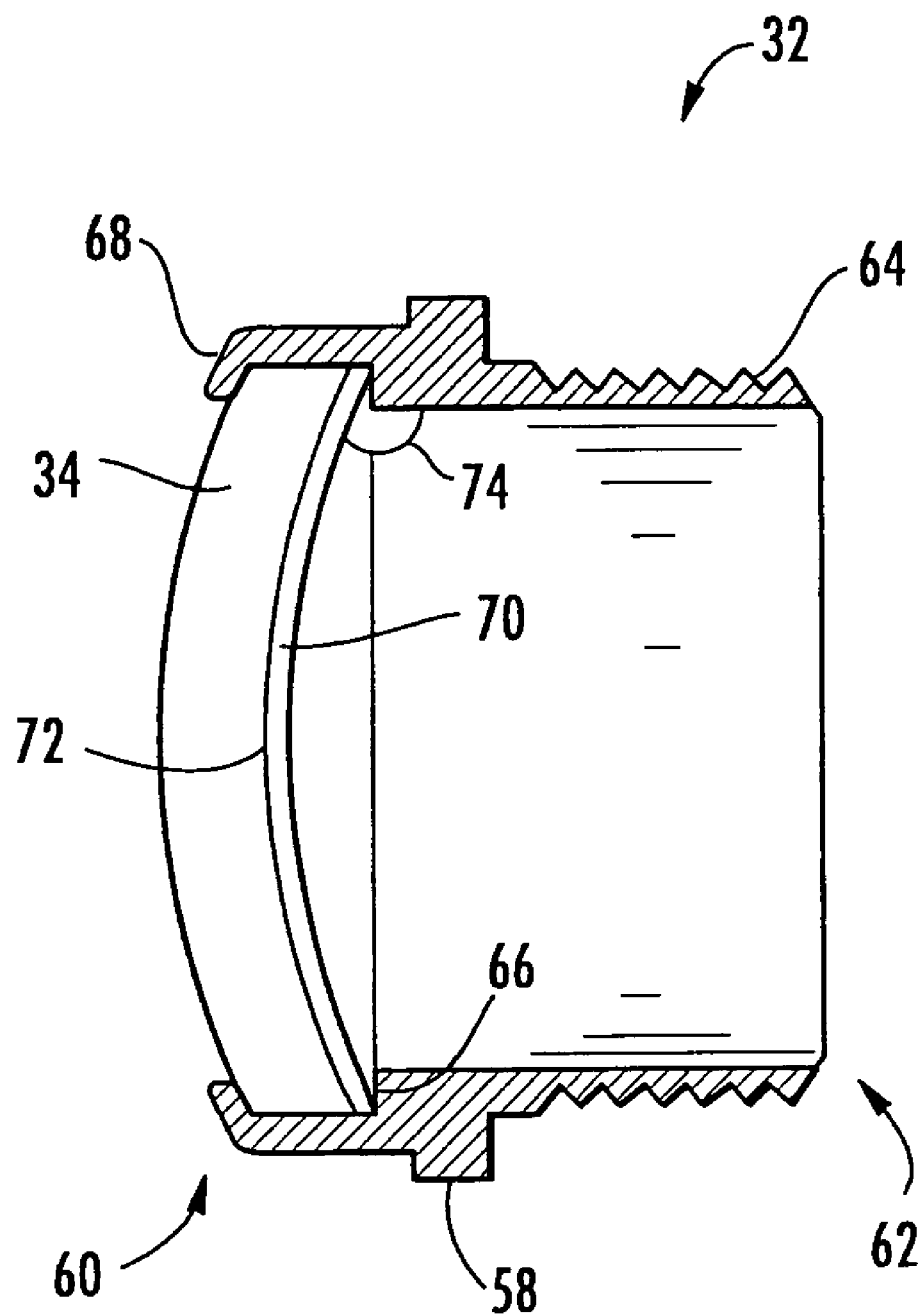
FIG. 4 is an enlarged cross-sectional view of a lens assembly constructed in accordance with the present invention.

FIG. 4 illustrates the lens assembly 32 in more detail. The lens assembly 32 includes an electrically conductive, generally cylindrical barrel 58 having a lens end 60 and a mounting end 62. The mounting end 62 includes suitable mounting means for securing the lens assembly 32 to the housing 24, such as the illustrated threads 64. The lens end 60 includes means for securing a lens 34. In the illustrated example, the lens 34 is disposed against a shoulder 66 formed in the barrel 58 and held in place by a flange 68 which is crimped down against the lens 34.

The lens 34 allows electromagnetic energy to pass to the spark sensor 38 while protecting the spark sensor 38 from debris and physical damage. The lens 34 is of a known type which functions as a low-pass filter transparent to energy corresponding to approximately the infrared band and lower frequencies, and may be constructed from a material such as glass or plastic. A conductive coating 70 is disposed on the interior surface 72 of the lens 34. The coating 70 is electrically coupled to the barrel 58, for example by solder or the drop of conductive epoxy 74 illustrated.

The coating 70 is a material that blocks RF energy while allowing IR energy to pass through it substantially unimpeded. Applicants have discovered that using an RF shielding coating prevents false alarms caused by static electric spark discharges. The coating 70 absorbs RF energy, and conducts any accumulated charge away from the spark sensor 38 though a ground path. In the illustrated example the coating 70 comprises a known indium tin oxide material, however any conductive coating which is transparent to IR energy may be used. Examples of other known conductive coating materials include nickel, gold, silver, and graphite. The thickness of the coating 70 is selected so that infrared energy can pass substantially unimpeded to the spark sensor 38. The coating 70 may be relatively thin, as the energy level of any expected static electric discharge is quite low. Furthermore, as the coating thickness increases, it would undesirably block the transmission of IR energy. In the illustrated example the thickness of the coating 70 is about 1 micrometer (0.039 mil) to about 4 micrometers (0.156 mil), and preferably about 1 micrometer (0.039 mil). This results in an infrared attenuation of only about 0.1%.

The coating 70 may be applied to the lens 34 by any of a number of known processes including physical vapor deposition (PVD) and chemical vapor deposition (CVD). One preferred physical vapor deposition process for applying the coating 70 is sputtering.

In operation, the lens 34 and the coating 70 cooperate to allow the spark sensor 38 to detect sparks from glowing material flowing through the protected volume while significantly reducing or eliminating false alarms caused by static electric discharges. It is thought that the energy from static discharges occurs mostly in the RF and UV bands, and that the combination of the lens filtering effect and the RF barrier coating 70 prevent substantially all of the energy of static electric discharges from reaching the spark sensor 38. In any case, it has been observed that the lens assembly 32 described above substantially reduces the incidence of false alarms attributable to static electric discharges.

The foregoing has described a spark detection system having a coated lens assembly. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A spark detector comprising:
    a duct adapted to pass a flow of flammable material therethrough;
    a spark sensor responsive to the impingement of radiation thereon;
    a lens adapted and positioned to receive infrared energy from said duct and pass said energy therethrough to said spark sensor;
    a conductive coating disposed on one side of said lens, said coating effective to block radio frequency energy but pass infrared energy therethrough; and
    an electrical ground path connected to said coating.

2. The spark detector of claim 1 further comprising an electrically conductive housing which receives said lens.

3. The spark detector of claim 2 wherein said conductive coating is electrically connected to said housing.

4. The spark detector of claim 3 wherein a conductive epoxy is disposed in contact with said conductive coating and said housing.

5. The spark detector of claim 2 wherein said conductive coating comprises indium-tin-oxide.

6. The spark detector of claim 2 wherein the thickness of said coating is from about 1 micrometer to about 4 microns.

7. The spark detector of claim 6 wherein the thickness of said coating is about 1 micrometer.

8. The spark detector of claim 2 wherein said housing is mounted in a casing.

9. The spark detector of claim 8 wherein said casing is electrically conductive and said casing is connected to an electrical ground path.

10. The spark detector of claim 8 wherein said casing comprises high temperature plastic.

* * * * *